United States Patent
Banham-Hall et al.

(10) Patent No.: US 10,298,015 B2
(45) Date of Patent: May 21, 2019

(54) METHODS OF CONTROLLING A COMBINED PLANT INCLUDING AT LEAST ONE GENERATOR AND AN ENERGY STORE

(75) Inventors: Dominic David Banham-Hall, Rugby (GB); Christopher Alan Smith, Rugby (GB); Gareth Anthony Taylor, London (GB)

(73) Assignee: GE ENERGY POWER CONVERSION TECHNOLOGY LTD., Rugby Warwickshire (GB)

( * ) Notice: Subject to any disclaimer, the term of this patent is extended or adjusted under 35 U.S.C. 154(b) by 1280 days.

(21) Appl. No.: 14/344,363

(22) PCT Filed: Sep. 13, 2012

(86) PCT No.: PCT/EP2012/067982
§ 371 (c)(1),
(2), (4) Date: Jul. 21, 2014

(87) PCT Pub. No.: WO2013/041443
PCT Pub. Date: Mar. 28, 2013

(65) Prior Publication Data
US 2015/0001931 A1    Jan. 1, 2015

(30) Foreign Application Priority Data
Sep. 21, 2011    (EP) .................................... 11007692

(51) Int. Cl.
*H02J 3/28*    (2006.01)
*H02J 3/38*    (2006.01)

(52) U.S. Cl.
CPC ............... *H02J 3/28* (2013.01); *H02J 3/386* (2013.01); *Y02E 10/763* (2013.01); *Y10T 307/352* (2015.04)

(58) Field of Classification Search
None
See application file for complete search history.

(56) References Cited

U.S. PATENT DOCUMENTS

| 7,908,036 B2 | 3/2011 | Kirchner et al. |
| 8,110,941 B2 | 2/2012 | Boss et al. |

(Continued)

FOREIGN PATENT DOCUMENTS

| EP | 2139090 A1 | 12/2009 |
| JP | 2000175360 A | 6/2000 |

(Continued)

OTHER PUBLICATIONS

European Search Report from corresponding European application No. 11007692, dated Mar. 15, 2012.

(Continued)

*Primary Examiner* — Jared Fureman
*Assistant Examiner* — Aqeel H Bukhari
(74) *Attorney, Agent, or Firm* — GE Global Patent Operation; Scott R. Stanley

(57) ABSTRACT

A method of controlling a combined plant to provide frequency support to a power grid operating at a variable grid frequency, wherein the combined plant includes at least one generator and an energy store, and the combined plant is adapted to supply power to the power grid, the method including the steps of charging the energy store at less than its rated power when frequency support is not needed. When frequency support is needed the combined plant is controlled to increase or decrease the overall power that it supplies to the power grid to provide frequency support. The control of the combined plant can be designed to maximize frequency support revenues.

16 Claims, 3 Drawing Sheets

(56) References Cited

U.S. PATENT DOCUMENTS

| | | |
|---|---|---|
| 2010/0090532 A1 | 4/2010 | Shelton et al. |
| 2010/0127664 A1* | 5/2010 | Paice .................. H02J 3/32 |
| | | 320/134 |
| 2010/0138070 A1 | 6/2010 | Beaudoin |
| 2010/0156348 A1* | 6/2010 | Kirchner ............. H02J 7/042 |
| | | 320/109 |
| 2010/0213763 A1* | 8/2010 | Boss .................... H02J 3/14 |
| | | 307/29 |
| 2011/0074151 A1 | 3/2011 | Burra |
| 2011/0137481 A1 | 6/2011 | Manz |

FOREIGN PATENT DOCUMENTS

| | | |
|---|---|---|
| JP | 2011078313 A | 4/2011 |
| WO | 20010104167 | 9/2007 |
| WO | 2010108910 A2 | 9/2010 |

OTHER PUBLICATIONS

Banham-Hall et al., "Frequency control using Vanadium redox flow batteries on wind farms", Power and Energy Society General Meeting, IEEE, Jul. 24, 2011, pp. 1-8.

Shinya et al., "Battery Control Method for Hybrid Wind Power System" International Exhibition and Conference for Power Electronics, Intelligent Motion Power Quality, PCIM Europe 2011 Mesago PCIM GmbH Stuttgart, German, May 19, 2011, pp. 311-316.

International Search Report from corresponding PCT application No. PCT/EP12/067982, dated Sep. 19, 2013.

* cited by examiner

METHODS OF CONTROLLING A COMBINED PLANT INCLUDING AT LEAST ONE GENERATOR AND AN ENERGY STORE

TECHNICAL FIELD

The present invention relates to methods of controlling a combined plant including at least one generator (electrical machine) and an energy store that can absorb power and discharge power, typically into a power grid or transmission network.

BACKGROUND ART

The grid frequency is the means by which supply and demand of electricity is balanced within a power grid or transmission network. The power grid will typically operate at a nominally fixed voltage and frequency, although the latter will almost certainly vary between upper and lower statutory limits defined in the various standards and grid codes. Such grid frequency variations result from power imbalances within the overall network—a rising frequency indicates an excess of generated power and may be caused by a fall in demand, and a falling frequency may be caused by a shortfall of generated power or a power station trip, for example.

Transmission system operators (TSOs) will try to maintain the grid frequency at the nominally fixed (or target) frequency by contracting or purchasing frequency response reserves. Positive reserve is often referred to as 'headroom' and negative reserve is often referred to as 'footroom'. Both can be provided by service providers that provide frequency support by regulating the amount of power that they supply into the power grid or take out of the power grid (i.e. reduce their power consumption) either automatically in response to changes in the grid frequency or on receipt of instructions from the TSO. For example, the TSO may contract an electricity generating company to maintain headroom so that additional power can be supplied into the power grid almost instantaneously in the event of a fall in supply frequency.

In most cases the service provider is compensated through holding payments that are proportional to the amount of headroom and/or footroom that they maintain:

Revenue (£)=Headroom (MW)×Low Frequency Holding Payment (£/MW/Hr)×Time (hr)

and/or

Revenue (£)=Footroom (MW)×High Frequency Holding Payment (£/MW/Hr)×Time (hr).

The effectiveness of this frequency response arrangement between the TSO and the service providers means that the grid frequency rarely deviates far from the target frequency. As a result, service providers rarely have to provide the full headroom and/or footroom that they are contracted to maintain even though they continue to receive the holding payments for doing so.

SUMMARY OF THE INVENTION

The present invention provides a method of controlling a combined plant to provide frequency support to a power grid operating at a variable grid frequency, the combined plant comprising at least one generator (e.g. an electrical machine that can convert an intermittent resource such as wind, tidal or solar energy into electrical energy, or which is driven by a prime mover such as a diesel engine) and an energy store and adapted to supply power to the power grid, the method comprising the steps of: charging the energy store at less than its rated power when frequency support is not needed; and in response to an increase in grid frequency, providing frequency support to the power grid by increasing the charging rate of the energy store so that it absorbs more power.

When frequency support is not needed (e.g. the grid frequency is with the 'deadband' described in more detail below) then the energy store is charged so that it absorbs power but at a charging rate that is greater than zero and less than its rated power. However, when frequency support is needed, the combined plant can be controlled to increase or decrease the overall power that it supplies to the power grid. In particular, if the grid frequency increases then frequency support can be provided to the power grid by increasing the charging rate of the energy store so that it absorbs more power. This has the effect of either reducing the overall power output of the combined plant or in some circumstances can mean that the energy store actually absorbs power from the power grid. It will be readily appreciated that the charging rate of the energy store is controlled in accordance with changes in the grid frequency and not in accordance with any other sort of control response, e.g. a power smoothing response where an energy store is charged and discharged at a variable rate to try and maintain a substantially constant total output power for an associated generator. Frequency support can also be provided to the power grid by decreasing the amount of power that is generated by the generator(s) and supplied to the power grid.

The energy store can absorb (or be charged with) power generated by the generator(s) and/or power taken from the power grid.

If the grid frequency decreases then frequency support can be provided to the power grid by decreasing the charging rate of the energy store so that it absorbs less power. If necessary then stored power can actually be discharged from the energy store into the power grid.

Any reference herein to the 'rated power' (Prated) of the energy store will be the rated power that is applicable when the energy store is being charged or discharged. In practice the rated power for charging and discharging may be the same but this will depend on the particular energy store.

The combined plant can provide continuous frequency support in response to changes in the grid frequency. Although frequency support is normally continuous, the amount of support is normally very small if the grid frequency is between certain upper and lower frequency limits. For example, in the United Kingdom where the target frequency is 50 Hz then for all practical purposes no frequency support is needed if the grid frequency is 50±0.015 Hz. This range is sometimes referred to as the 'deadband'. As the grid frequency moves further away from the target frequency then more significant frequency support is needed and this can be provided by the combined plant based on its available headroom and footroom, respectively. The combined plant can provide frequency support by responding automatically to measured changes in the grid frequency or on receipt of a control signal (or 'area control error') from the Transmission System Operator (TSO).

The energy store can have any suitable form including a flywheel, a conventional battery such as a lithium ion or nickel-cadmium battery, a flow battery such as a vanadium redox battery, a supercapacitor, a pumped hydroelectric store, a compressed air store etc. The energy store is connected to the power grid (optionally by any suitable power converter means) so that stored power can be supplied to the power grid to provide frequency response support. The energy store can also be charged with power that is taken from the power grid. It will be readily appreciated that any energy store will have a finite energy capacity that must not be exceeded.

The generator(s) and the energy store do not have to be physically co-located but are controlled together by the same control strategy, typically in a way that maximises 'paid for' or auxiliary services such as frequency response revenues (i.e. holding payments from the TSO for maintaining headroom and/or footroom) and/or that maximises utilisation of the generator(s) by allowing intermittent renewable energy devices to run all the time. In one arrangement a plurality of generators (e.g. a wind farm) can be connected to the power grid by a transmission link or cable of any suitable type that can, where necessary, be specifically designed to be suitable for subsea or offshore use. The generator(s) can be connected to the grid by means of a suitable power converter or power conversion equipment. The energy store can be associated with a particular generator or group of generators, connected to the transmission link, or connected to the power grid, e.g. to the network-side of a transformer that is electrically connected between the transmission link and the power grid by means of an active rectifier/inverter or static synchronous compensator (STATCOM), for example. The energy store of the combined plant can comprise a plurality of energy store units that can be optionally physically co-located or located at different points around the power generation and transmission system. For example, in an arrangement where the combined plant includes a plurality of generators then each generator may include its own dedicated energy store unit.

The overall power output P of the combined plant at any given time can be defined as:

$$P = P_{gen} \pm P_{estore}$$

where: Pgen is the power supplied by the generator(s) of the combined plant at the given time, e.g. the power that can be converted from an intermittent resource such as wind, tidal or solar energy, or from a prime mover such as a diesel engine, and Pestore is the power that is supplied by the energy store or absorbed by the energy store at the given time. It will be readily appreciated that Pestore is positive (+ve) when the energy store is being discharged and negative (−ve) when the energy store is being charged.

The overall power output P of the combined plant might be negative if the energy store is controlled to absorb more power than is being supplied into the power grid by the generator(s).

When no frequency support is needed (i.e. when the grid frequency is at or very close to the target frequency) then the overall power output P from the combined plant at any given time can be defined as:

$$P = P_{gen} - P_{estore\_target}$$

$$P = P_{gen} - (r\_charging\_target \times P_{rated})$$

where:
Prated is the rated power of the energy store, Pestore_target is the power absorbed by the energy store when frequency support is not needed, and r_charging_target represents a particular charging rate when frequency support is not needed and where 0<r_charging_target<1.

In other words, while the grid frequency is at or very close to the target frequency then the energy store will be absorbing power at a particular charging rate which is expressed as a proportion of its rated power.

The headroom of the combined plant is its margin for increasing its overall power output P in response to a fall in grid frequency. The present method does not exclude the generator(s) providing headroom but if the generator(s) are already providing maximum power (e.g. in the case of an intermittent resource such as wind, tidal or solar energy into electrical energy then the maximum amount of electrical energy is already being converted) then an increase in the overall power output P can only be provided by the energy store. Frequency support can be provided by reducing the amount of power that the energy store absorbs and/or by actually discharging stored power into the power grid. In practice the energy store can apply a control strategy that gradually increases the overall output power P of the combined plant in response to the decreasing grid frequency, more particularly, until such time as the grid frequency is stabilised. This control strategy can initially involve gradually reducing the charging rate to zero (no charging). If further frequency support is needed then the energy store can start to discharge power into the power grid at a discharging rate that is gradually increased up to the rated power. The maximum overall power output Pmax=Pgen+Prated which represents the energy store discharging stored power at its rated power (i.e. Pestore=Prated).

The following example is provided only for the purposes of illustrating the proposed method:

A combined plant comprises a wind farm supplying an output power of 10 MW and an energy store having a rated power of 15 MW. When frequency support is not needed then the energy store is charged at 5 MW. The overall output power P from the combined plant is therefore 5 MW (P=Pgen−Pestore=10 (MW)−5 (MW)) and represents the normal output power for the combined plant when the grid frequency is at or very close to the target frequency (e.g. within the deadband). The output power can be increased or decreased to provide frequency support. More particularly, the combined plant can use a control strategy that gradually increases (or ramps up) its overall output power by 2 MW for every 0.1 Hz fall in the grid frequency. This change in the overall output power of the combined plant can be achieved by varying the charging and discharging rates of the energy store in accordance with the control strategy.

If the grid frequency gradually falls below the target frequency of 50 Hz then the charging rate is gradually decreased (or ramped down) so that the energy store absorbs less power. At a frequency of 49.75 Hz the energy store will not be absorbing any power (i.e. the charging rate will be zero) and the overall output power P will have increased from 5 MW to 10 MW (P=Pgen±Pestore=10 (MW)±0 (MW)). If the grid frequency continues to decrease then the energy store will start to discharge power to the power grid. At a frequency of 49 Hz the energy store will be discharging power at its rated power and a maximum overall power output Pmax of 25 MW for the combined plant will have been achieved (Pmax=Pgen+Prated=10 (MW)+15 (MW)).

The maximum headroom Hmax of the combined plant can therefore be defined as:

$$H_{max} = P_{rated} + P_{estore\_target}$$

$$H_{max} = P_{rated} + (r\_charging\_target \times P_{rated})$$

In the case of the above example then the maximum headroom Hmax of the combined plant is 20 MW (Hmax=Prated+Pestore_target=15 (MW)+5 (MW)).

By way of comparison, the maximum headroom for a stand-alone energy store connected to the power grid would be its rated power. Controlling the energy store to absorb power supplied by the generator(s) while the grid frequency is at or very close to the target frequency therefore increases the maximum headroom and maximises frequency response revenues.

The footroom of the combined plant is its margin for reducing its overall power output P in response to an increase in grid frequency. The generator(s) will typically be able to decrease the power that they supply to the power grid (e.g. in the case of a wind turbine then wind may be deliberately spilt and in the case where the generator is driven by a prime mover such as a diesel engine then the speed of the diesel engine can be reduced). Power from the generator(s) may be reduced to a minimum output power Pgen_min which represents the lowest power that the generator(s) can output in a stable manner and without tripping. In the case of a wind turbine then this may be nearly zero but extracting no power in high winds can be problematic.

A reduction in the overall power output P can also be provided by increasing the amount of the power that the energy store absorbs. In practice the combined plant can apply a control strategy that gradually reduces the overall output power P of the combined plant in response to the increasing grid frequency. This control strategy may prioritise frequency support provided by the energy store before controlling the generator(s) to decrease their output power, or the frequency support may be shared between the generator(s) and the energy store.

The control strategy for the energy store can involve gradually increasing the charging rate until the energy store is absorbing power (or charging) at its rated power. If frequency support provided by the energy store is prioritised and further frequency support is needed then the generator(s) can be controlled to gradually decrease their output power.

The maximum footroom Festore_max of the energy store can therefore be defined as:

*Festore_max=Prated−Pestore_target*

*Festore_max=Prated−(r_charging_target×Prated)*

In the case of the above example then the maximum footroom of the energy store is 10 MW (Festore_max=Prated−Pestore_target=15 (MW)−5 (MW)).

The maximum footroom Fgen_max of the generator(s) at any given time can be defined as:

*Fgen_max=Pgen−Pgen_min*

The maximum footroom Fmax of the combined plant at any given time can be defined as:

*Fmax=Fgen_max+Festore_max*

Under the proposed method the energy store is charging when the combined plant is supplying its normal output power, i.e. when the grid frequency is at or very close to the target frequency, and therefore only holds limited footroom to accommodate rises in the grid frequency. However, as discussed below, the probability of the grid frequency rising to the point where the additional footroom provided by the generator(s) needs to be used is low.

In the case of the above example then the combined plant can use a control strategy that gradually decreases (or ramps down) its overall output power by 2 MW for every 0.1 Hz rise in the grid frequency. This change in the overall output power of the combined plant can be achieved by varying the charging rate of the energy store in accordance with the control strategy.

If the grid frequency gradually rises above the target frequency of 50 Hz then the charging rate is gradually increased (or ramped up) so that the energy store absorbs more power. At a frequency of 50.5 Hz the energy store will be absorbing power at its rated power and the overall output power P will have decreased from 5 MW to −5 MW (i.e. the combined plant will be absorbing 5 MW from the power grid). If the grid frequency continues to decrease then the generator(s) can provide additional footroom, e.g. by gradually reducing their output power to Pgen_min. If the minimum output power Pgen_min is nearly zero then the combined plant can use the additional 10 MW of footroom provided by the generator(s) (Fmax=Fgen_max+Festore_max=(Pgen−Pgen_min)+(Prated−Pestore_target)=(10 (MW)−0 (MW))+(15 (MW)−5 (MW))=20 MW).

The deviation of the grid frequency has a near log-normal probability distribution centred on the target frequency, for example 50 Hz. This means that service providers rarely have to use their full headroom or footroom. Because the grid frequency does not often significantly exceed the upper frequency limit, the combined plant can optimise its headroom by controlling the energy store to absorb power when the grid frequency is within the deadband. Although the footroom provided by the energy store is reduced compared to that for a stand-alone energy store with the same rated power, the combined plant can still take advantage of the additional footroom provided by the generator(s). The proposed method therefore allows the energy store of the combined plant to maintain a headroom that is greater than its rated power, whilst simultaneously maintaining increased footroom.

The charging rate (r_charging_target) of the energy store when frequency support is not needed and the grid frequency is at or very close to the target frequency can be fixed or selectively varied depending on the circumstances. For example, the charging rate can be fixed for a particular power grid or selectively varied to take account of changes in the frequency support needs of the TSO or environmental conditions. The charging rate will typically be selected to maximise frequency support revenues. As the charging rate is increased then optimisation in frequency response revenues becomes a trade off between the increased frequency response revenues from holding more reserves (both headroom and footroom) and the decrease in revenues for the power supplied by the generator(s) to the power grid. More particularly, if more of the power supplied by the generator(s) has to be absorbed by the energy store during normal operation then it cannot be supplied to the power grid, leading to lost revenue when the generator has to reduce output or because of round trip losses in the energy store.

The charging rate is, in an embodiment, selected to give optimal revenue for the particular power grid. For example, in the United Kingdom it has been found that the charging rate when frequency support is not needed should, in an embodiment, be between about 0.6 and about 0.8, and, in an embodiment, about 0.7 (i.e. Pestore_target=0.7×Prated). This implies that the frequency reserve revenues may be about 70% higher than for a conventional stand-alone energy store connected to the power grid.

DRAWINGS

DETAILED DESCRIPTION

Although the following description refers to a wind farm, it will be readily appreciated that the claimed method is applicable to any suitable generator(s) including those that convert other intermittent resources such as tidal or solar energy into electrical energy, or which are driven by a prime mover such as a diesel engine.

Figure 1:
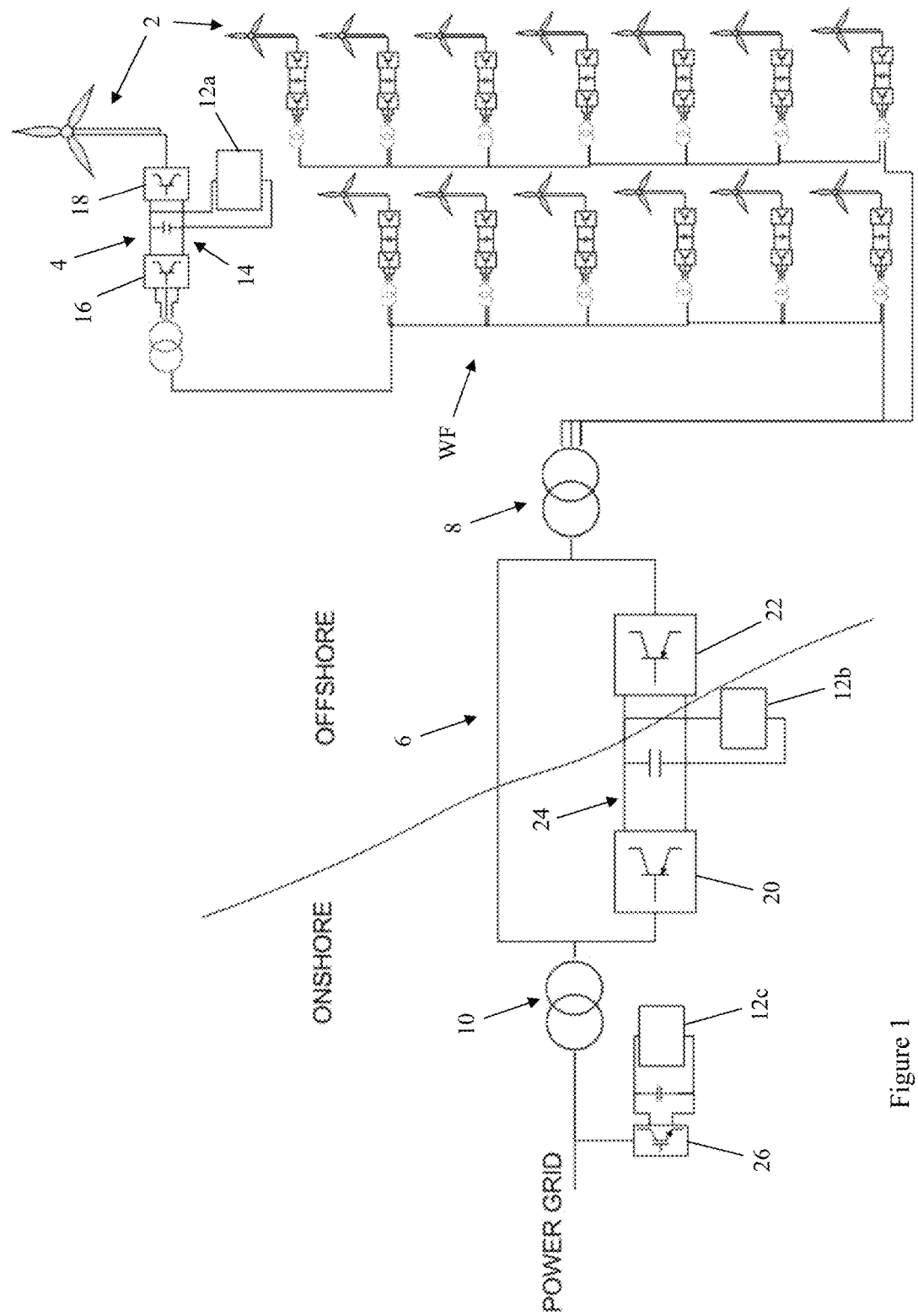
FIG. 1 is a schematic diagram showing a combined plant that can be controlled in accordance with the present invention.

FIG. 1 shows an offshore wind farm WF consisting of a number of individual wind turbines 2. Each wind turbine 2 includes a turbine assembly with turbine blades that drives the rotor of a generator, either directly or by means of a gearbox. The ac frequency that is developed at the stator terminals of the generator (the 'stator voltage') is directly proportional to the speed of rotation of the rotor. The voltage at the generator terminals also varies as a function of speed and, depending on the particular type of generator, on the flux level. For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades.

Each wind turbine generator is connected to a distribution network by means of an individual power converter 4. The distribution network is connected to an ac transmission link 6 by means of a step-up transformer 8. In an alternative arrangement the ac transmission link could be replaced by a high voltage direct current (HVDC) transmission link. The ac transmission link connects the offshore wind farm to a power grid by means of a step-up transformer 10.

An energy store 12 can be positioned at three different locations where it can absorb power from the wind turbine generators and supply power to the power grid.

A first option is that an independently-located energy store is positioned at each of the wind turbines. As shown in FIG. 1, a dc energy store 12a of any suitable type can be connected to a dc link 14 between a pair of active rectifier/inverters 16, 18 that are used to interface the respective generator to the distribution network. The energy stores 12a can be controlled together or controlled separately with their associated wind turbine generator (e.g. the combined plant consists of an individual energy store 12a and its associated generator).

A second option is that the energy store is connected to the transmission link 6. More particularly, the transmission link may include a pair of active rectifier/inverters 20, 22 connected together by a dc link 24. A dc energy store 12b of any suitable type is then connected to the dc link 24.

A third option is that a dc energy store 12c of any suitable type is connected to the power grid (optionally at the network-side of the step-up transformer 10) by means of an active rectifier 26.

The energy store 12 and the wind turbine generators are controlled using the same control strategy.

Figure 2:
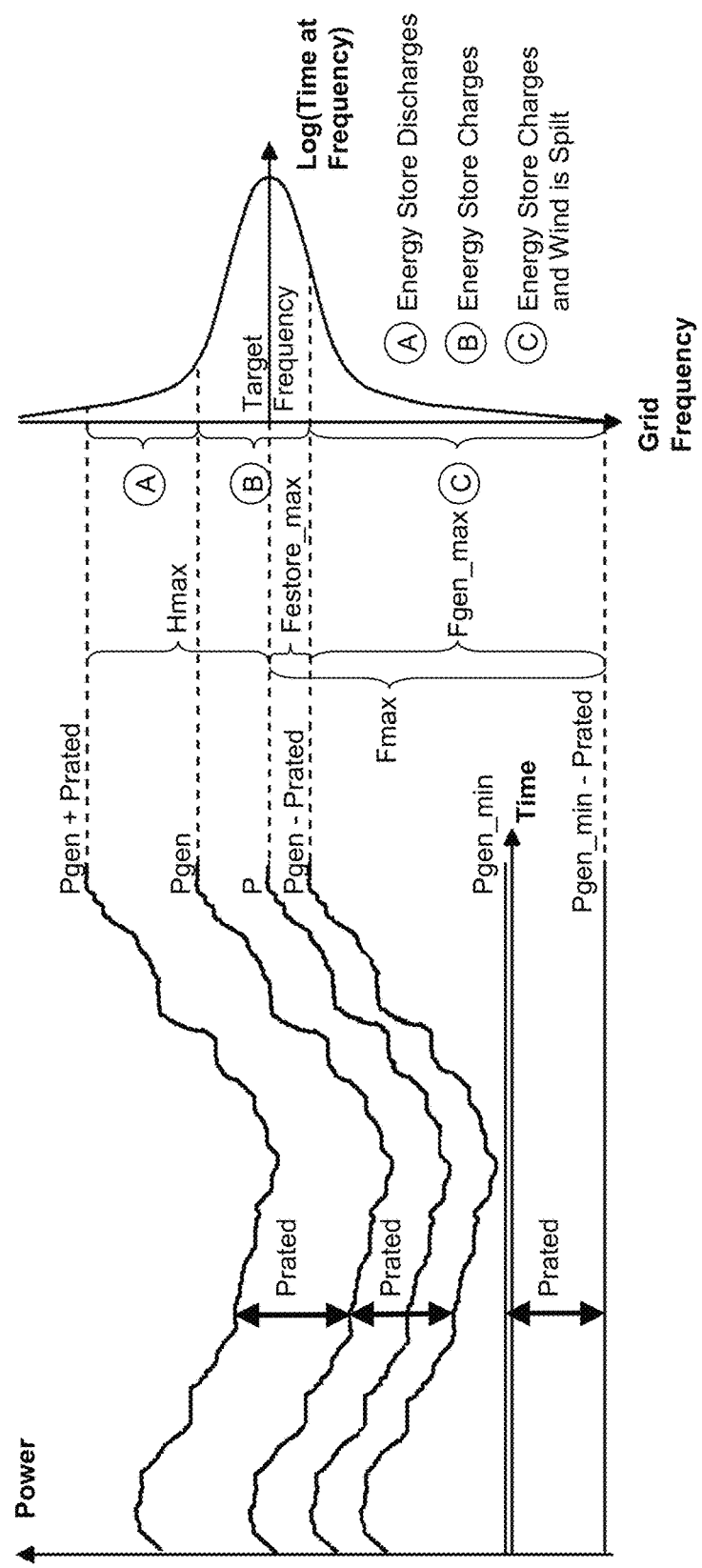
FIG. 2 shows the headroom and footroom maintained by the combined plant of FIG. 1 and the distribution of grid frequency.

As shown in FIG. 2, the power output Pgen of the wind farm WF will vary with wind speed. It will be assumed that the wind turbine generators are providing maximum power (i.e. that the maximum amount of electrical energy is being extracted from the available and varying wind).

FIG. 2 shows the situation where the grid frequency stays at or close to the target frequency (e.g. within the deadband). The energy store is therefore charging and absorbing power (Pestore_target). The overall power output P of the combined plant at any given time is defined by:

$$P = Pgen - Pestore\_target$$

where Pgen varies with wind speed.

The maximum headroom Hmax for the combined plant is defined by:

$$Hmax = Prated + Pestore\_target$$

The maximum footroom Festore_max of the energy store is defined by:

$$Festore\_max = Prated - Pestore\_target$$

The maximum footroom Fgen_max of the generator(s) is defined as:

$$Fgen\_max = Pgen - Pgen\_min$$

The maximum footroom Fmax of the combined plant is defined as:

$$Fmax = Fgen\_max + Festore\_max$$

FIG. 2 shows that the deviation of the grid frequency has a near log-normal probability distribution centred on the target frequency, for example 50 Hz.

It can be seen that the grid frequency does not often exceed the point where the energy store 12 needs to discharge stored power into the power grid and that the energy store can provide frequency support in response to falling grid frequency while continuing to charge (although at a lower rate). Power that is stored in the energy store 12 can be sold at a later date. It can also be seen that the grid frequency does not often exceed the point where the wind turbine generators need to be controlled to reduce their output power, e.g. where wind needs to be spilt.

Figure 3:
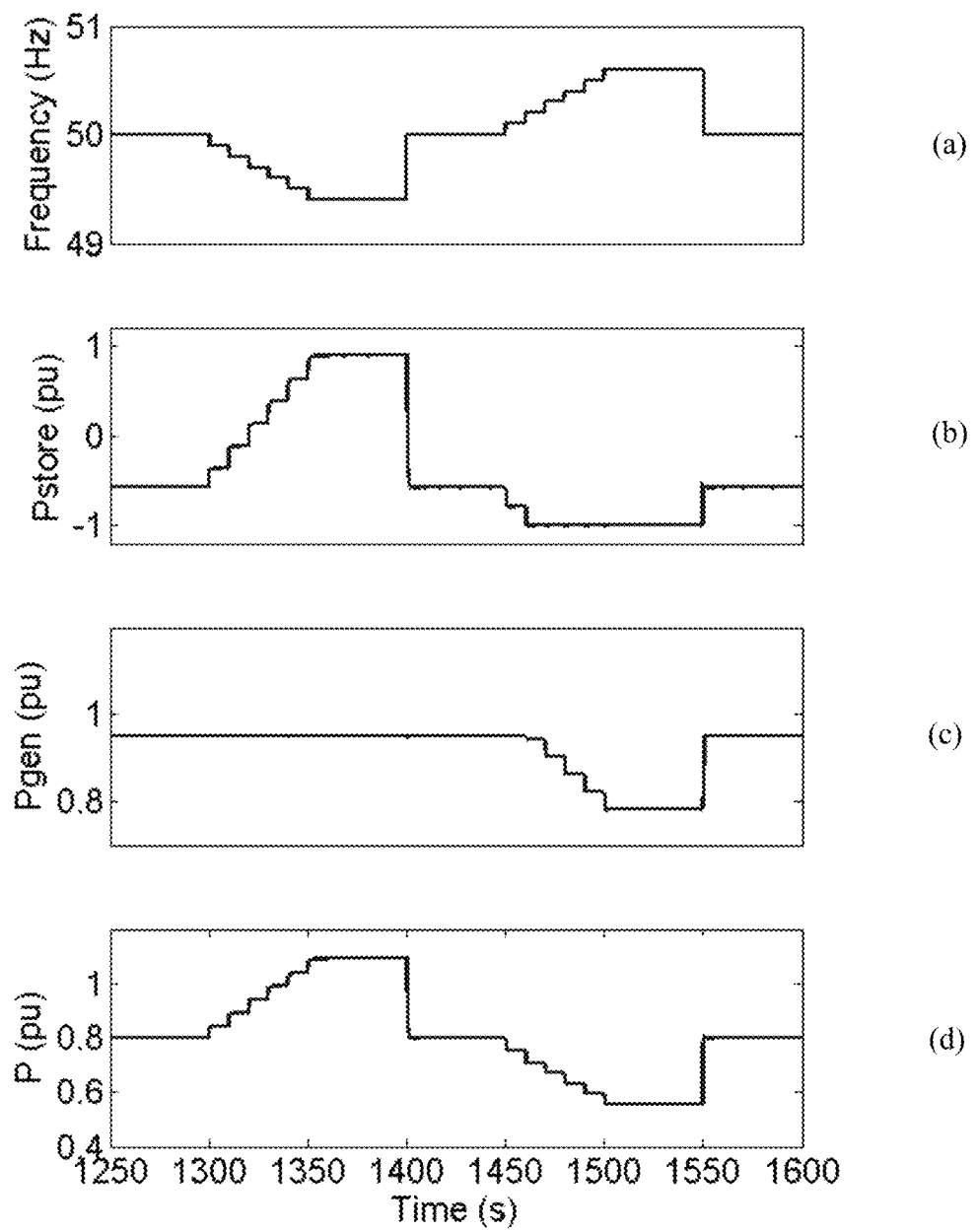
FIG. 3 shows how the energy store and the wind turbine generators of the combined plant of FIG. 1 can provide frequency support.

FIG. 3 shows how the headroom and footroom of the combined plant can be utilised to provide frequency support to the power grid.

Graph (a) shows how the grid frequency varies with time. At time t=1300 s the grid frequency falls from the target frequency of 50 Hz to 49.4 Hz and then returns to the target frequency at time t=1400 s. At time t=1450 s the grid frequency rises from the target frequency to 50.6 Hz and then returns to the target frequency at time t=1550 s.

Graph (b) shows how the power output (pu) of the energy store 12 varies with time. Until time t=1300 s the grid frequency is at the target frequency (or within the deadband) and the energy store 12 is absorbing power at its specified charging rate Pestore_target. As the grid frequency falls below the target frequency the energy store starts to absorb less power. Eventually the charging rate reaches zero. As the grid frequency continues to fall the energy store 12 will start to discharge stored power to the power grid. The amount of power discharged to the power grid increases until the grid frequency stabilises. At time t=1400 s the grid frequency returns to the target frequency and the energy store 12 starts to absorb power once again at its specified charging rate Pestore_target. At t=1450 s the grid frequency starts to rise above the target frequency and the energy store 12 starts to absorb more power. Eventually the energy store 12 will be absorbing power at its rated power (i.e. Pestore=Prated) and the maximum footroom Festore_max is reached. At time t=1550 s the grid frequency returns to the target frequency and the energy store 12 starts to absorb power at its specified charging rate.

Graph (c) shows how the power output (pu) of the wind turbine generators varies with time. Assuming constant wind conditions, the power output of the wind turbine generators does not vary until the energy store 12 is absorbing power at its rated power and the maximum footroom Festore_max is reached. To provide additional footroom, the output power of the wind turbine generators is reduced until the grid frequency stabilises. At time t=1550 s the grid frequency returns to the target frequency and the wind turbine generators start to extract the maximum available power from the available wind.

Graph (d) shows how the power output (pu) of the combined plant varies with time. The power output increases at time t=1300 s as the energy store 12 starts to absorb less power and then discharges power into the power grid. The power output decreases at time t=1450 s as the energy store 12 starts to absorb more power and then, once the energy store reaches its rated power, as the output power of the wind turbine generators is reduced to provide additional footroom.

It will be readily appreciated that in practice the combined plant will operate in an environment with both varying wind and varying grid frequency.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling a combined plant to provide frequency support to a power grid operating at a variable grid frequency, wherein the combined plant comprises at least one generator and an energy store, and is configured to supply power to the power grid, the method comprising:
    charging the energy store at less than the rated power of the energy storewhen frequency support is not needed; and
    in response to an increase in grid frequency, providing frequency support to the power grid by increasing the charging rate of the energy store so that the energy store absorbs more power;
    wherein, when frequency support is not needed, the overall power output P from the combined plant at any given time is defined by:
    P=Pgen−Pestore_target, or P=Pgen−($r\_charging\_target$×Prated), where:
        Pgen is the power supplied by the at least one generator of the combined plant at the given time,
        Pestore_target is the power absorbed by the energy store at the given time when frequency support is not needed,
        r_charging_target represents a particular charging rate when frequency support is not needed and where 0<r_charging_target<1, and
        Prated is the rated power of the energy store.
2. The method according to claim 1, wherein the energy store is configured to absorb power generated by the at least one generator and/or from the power grid.
3. The method according to claim 1, further comprising:
    in response to an increase in grid frequency, providing frequency support to the power grid by decreasing the amount of power that is generated by the at least one generator.
4. The method according to claim 1, further comprising:
    in response to a decrease in grid frequency, providing frequency support to the power grid by decreasing the charging rate of the energy store so that the energy store absorbs less power.
5. The method according to claim 1, further comprising:
    in response to a decrease in grid frequency, providing frequency support to the power grid by discharging power from the energy store into the power grid.
6. The method according to claim 1, wherein the combined plant provides continuous frequency support to the power grid in response to changes in the grid frequency.
7. The method according to claim 1, wherein the combined plant provides frequency support to the power grid based on the available headroom and footroom of the combined plant.
8. The method according to claim 1, wherein the combined plant provides frequency support to the power grid by responding automatically to measured changes in the grid frequency or on receipt of a control signal from a Transmission System Operator (TSO).
9. The method according to claim 1, wherein the combined plant is controlled by a control strategy.
10. The method according to claim 9, wherein the control strategy maximizes frequency response revenues.
11. The method according to claim 9, wherein the control strategy maximizes utilization of the at least one generator.
12. The method according to claim 1, wherein the maximum headroom Hmax provided by the combined plant is defined by:

$$H\text{max}=P\text{rated}+P\text{estore\_target, or}$$

$$H\text{max}=P\text{rated}+(r\_charging\_target\times P\text{rated}),$$

where:
    Prated is the rated power of the energy store,
    Pestore_target is the power absorbed by the energy store when frequency support is not needed, and
    r_charging_target represents a particular charging rate when frequency support is not needed and where 0<r_charging_target<1.
13. The method according to claim 1, wherein the maximum footroom Festore_max provided by the energy store is defined by:

$$F\text{estore\_max}=P\text{rated}-P\text{estore\_target, or}$$

$$F\text{estore\_max}=P\text{rated}-(r\_charging\_target\times P\text{rated}),$$

where:
    Prated is the rated power of the energy store,
    Pestore_target is the power absorbed by the energy store when frequency support is not needed, and
    r_charging_target represents a particular charging rate when frequency support is not needed and where 0<r_charging_target<1.
14. The method according to claim 1, wherein the maximum footroom Fgen_max of the generator(s) at any given time is defined by:

$$F\text{gen\_max}=P\text{gen}-P\text{gen\_min},$$

where:
    Pgen is the power supplied by the generator(s) of the combined plant at the given time, and Pgen_min is the lowest power that the generator(s) can output in a stable manner and without tripping.

15. The method according to claim 1, wherein the rate at which the energy store is charged when frequency support is not needed is fixed or selectively varied.

16. The method according to claim 1, wherein the rate at which the energy store is charged when frequency support is not needed is selected to maximize frequency support revenues.

* * * * *